United States Patent Office 2,756,228
Patented July 24, 1956

2,756,228
NOVEL PROCESS FOR THE MANUFACTURE OF 6-MERCAPTOPURINE FROM AMINOGLYOXALINE-5-THIOCARBOXAMIDE

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application June 20, 1955, Serial No. 516,735

Claims priority, application Great Britain July 30, 1954

2 Claims. (Cl. 260—252)

This invention relates to a novel method for the manufacture of 6-mercaptopurine. The synthesis of 6-mercaptopurine from hypoxanthine and through the intermediate 4-amino-5-formamido-6-mercaptopyrimidine has been described in the copending applications of Hitchings and Elion, Serial No. 292,974, now Patent No. 2,697,709, and Serial No. 478,201, filed December 28, 1954. The valuable properties of 6-mercaptopurine in the treatment of the leukemias have been recognized and are more particularly described in the aforementioned patent of the present applicants.

This application relates to a novel route of access to this valuable substance, and is designed for certain special purposes, e. g., for the incorporation of isotopic radioactive carbon in the 2 position, and to provide an intermediate suitable for the preparation of 2-position variants of 6-mercaptopurine.

More particularly, the invention is based on the observation that 4-aminoglyoxaline-5-carboxamide can be converted to 4-aminoglyoxaline-5-thiocarboxamide by reaction with phosphorus pentasulfide and that the latter is converted to 6-mercaptopurine by reaction with formamide. This reaction may be represented as follows:

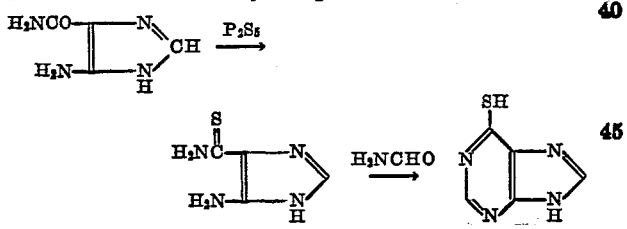

4-aminoglyoxaline-5-thiocarboxamide

A mixture of 4 g. of 4-amino-5-glyoxaline carboxamide, 12 g. of phosphorus pentasulfide and 100 ml. of dry pyridine was heated, under reflux conditions, for 2 hours. The pyridine was removed by distillation under reduced pressure. The residue was treated with 100 ml. of water and allowed to stand at room temperature for one hour. The mixture was filtered to remove small insoluble residue and the 4-amino-5-glyoxaline thiocarboxamide was precipitated by the addition of 1 liter of ethanol and 1 liter of ether.

6-mercaptopurine

The crude product was heated with 50 ml. of formamide at 190–200° for one hour to effect ring closure. After cooling, the mixture was diluted with 100 ml. of water and a small amount of brown precipitate removed. The 6-mercaptopurine was isolated by removal of the water and formamide under reduced pressure and recrystallization of the residue from water. The ultraviolet absorption spectrum of the product was identical with that of an authentic specimen of 6-mercaptopurine: at pH=1, λ max.=325 mµ; at pH 11, λ max.=232, 312 mµ.

What we claim is:

1. The process for the manufacture of 6-mercaptopurine which comprises reacting 4 - aminoglyoxaline - 5 - carboxamide with phosphorus pentasulfide, and reacting the product with formamide to form 6-mercaptopurine.

2. The process for the manufacture of 6-mercaptopurine which comprises reacting 4-aminoglyoxaline-5-thiocarboxamide with formamide to form the product 6-mercaptopurine.

No references cited.